(12) United States Patent
Uszkur et al.

(10) Patent No.: US 12,145,523 B2
(45) Date of Patent: Nov. 19, 2024

(54) METHOD FOR DETECTING STATE OF PRESENCE OF OBJECT IN VEHICLE

(71) Applicant: Aptiv Technologies AG, Schaffhausen (CH)

(72) Inventors: Marek Uszkur, Wieliczka (PL); Alexander Barth, Wermelskirchen (DE)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 17/809,102

(22) Filed: Jun. 27, 2022

(65) Prior Publication Data

US 2022/0410831 A1    Dec. 29, 2022

(30) Foreign Application Priority Data

Jun. 28, 2021 (EP) ..................................... 21182105

(51) Int. Cl.
*B60R 21/015* (2006.01)
*B60N 2/00* (2006.01)
*G06V 10/774* (2022.01)

(52) U.S. Cl.
CPC ........ *B60R 21/01512* (2014.10); *B60N 2/002* (2013.01); *B60R 21/01556* (2014.10); *G06V 10/774* (2022.01)

(58) Field of Classification Search
CPC ........ B60R 21/01512; B60R 21/01556; G06V 10/774; B60N 2/002
See application file for complete search history.

(56) References Cited

U.S. PATENT DOCUMENTS 7,084,763 B2      8/2006   Shieh et al.
2021/0350154 A1*  11/2021  Harper ................ B60R 11/0247

FOREIGN PATENT DOCUMENTS

CN      209993076 U  *  1/2020    ............. G08B 21/02
WO      2020165908      8/2020
WO      WO-2020165908 A2 *  8/2020  ........ B60W 50/0098

OTHER PUBLICATIONS

"Extended European Search Report", EP Application No. 22179896.0, Nov. 21, 2022, 9 pages.
"Extended European Search Report", EP Application No. 21182105.3, Dec. 15, 2021, 9 pages.

* cited by examiner

*Primary Examiner* — Jared Fureman
*Assistant Examiner* — Duc M Pham
(74) *Attorney, Agent, or Firm* — Harness, Dickey & Pierce, P.L.C.

(57) ABSTRACT

Systems and techniques are described herein for detecting a state of presence of a given object in a vehicle. In aspects, techniques include processing data received over time from various devices in the vehicle to determine a set of accumulated scores. The data includes parameters indicative of a presence or absence of a detected object in the vehicle. Further, the processing may be effective to determine a set of accumulated scores. The techniques further include determining an object-related confidence value representing a likelihood that the detected object is present in the vehicle, based on the set of accumulated scores, and then comparing the object-related confidence value to a predetermined threshold. The comparison is sufficient to detect the presence of the detected object in the vehicle if the object-related confidence value exceeds the predetermined threshold.

19 Claims, 3 Drawing Sheets

METHOD FOR DETECTING STATE OF PRESENCE OF OBJECT IN VEHICLE

INCORPORATION BY REFERENCE

This application claims priority to European Patent Application Number 22179896.0, filed Jun. 20, 2022, which in turn claims priority to European Patent Application Number 21182105.3, filed Jun. 28, 2021, the disclosures of which are incorporated by reference in their entirety.

BACKGROUND

In the automotive field, there is a desire to detect a child or an animal in the cabin of a vehicle to avoid the child or animal being left in the vehicle and having a heatstroke or health issue after the driver has left the vehicle. It may only take about ten minutes for a car to increase 20 degrees in temperature.

To sense a child in the cabin of a vehicle for example, a camera sensor may be used. If the child is in the field of view of the camera sensor, the child may be directly detected from the image data captured by the camera sensor by a vision algorithm of object detection. However, in order to sense the child in the field of view of a camera sensor, it might be necessary to have several camera sensors in different positions in the vehicle to cover the full cabin. Other sensors like radar sensors may detect through materials and be used in the cabin. Such sensors are more flexible in terms of positioning. But many vehicles are not equipped with such radar sensors to monitor the interior of the cabin.

In many situations, it is not possible to directly sense the child with the sensor(s) in the vehicle, in particular if there is a limited number of camera sensors in the cabin. For example, in a vehicle equipped with only one camera sensor positioned in the front of the cabin and directed to the back, it is not possible to directly detect a child that is in a back-seat rear facing.

Therefore, there is a need to solve the problem of overcoming the limitation of direct object visibility to detect the presence of a child or animal, and more generally the presence of a given object, in a vehicle. In other words, there is a need for facilitating the detection of the state of presence of a given object in the vehicle in various situations, including situations in which there is no direct visibility of said object from an image sensor device in the vehicle.

SUMMARY

The present disclosure concerns a computer-implemented method for detecting the state of presence of a given object in a vehicle, comprising the following steps: processing data received over time from various devices in the vehicle, said data including parameters related to the given object that are indicative of the presence or absence of the given object in the vehicle, to determine a set of accumulated scores; determining an object-related confidence value representing a likelihood that said given object is present in the vehicle, based on the set of accumulated scores; and comparing the object-related confidence value to a predetermined threshold to detect the presence of said object in the vehicle if said current object related confidence value exceeds the predetermined threshold.

The present method allows to accumulate scores determined by processing data received over time from various devices in the vehicle, for example in-vehicle sensors, said data including parameters related to the given object that are indicative of the presence or absence of the given object in the vehicle. In other words, the method allows to accumulate likelihoods or scores that the object is present or not present in the vehicle. The confidence value may be determined, typically while the vehicle is in operation, based on the accumulation of scores determined over time from the received data. It is compared to a threshold value and, when the confidence value reaches and/or exceeds the threshold, it is considered as sufficiently high to determine that the given object is present in the vehicle.

In an implementation, the step of determining the object-related confidence value may include updating the object-related confidence value when a new score is added to the set of accumulated scores. In another implementation, the step of processing data may be continuously performed over time while the vehicle is in operation to continuously accumulate scores over time in the set of accumulated scores. In a further implementation, the step of processing data may include deriving said parameters related to the given object from the received data, and mapping said parameters to respective scores. Thus, the data received from multiple in-vehicle devices are processed to determine parameters related to the given object, and said parameters are mapped to respective scores.

In implementations, the step of determining the object-related confidence value may include attributing weights to the respective accumulated scores. In a particular implementation, the step of determining the object-related confidence value may include calculating a cumulative sum of the accumulated scores. In an implementation, the scores may be weighted by respective weights in the cumulative sum. In further implementations, the step of processing data may use a machine-learning model, for example a neural network.

The received data or the parameters included in the received data may be provided as inputs to a machine-learning model. The machine-learning model may compute the confidence value representing the likelihood that the given object is present in the vehicle. A machine-learning model, for example a neural network, may be trained to detect the presence of the given object from data collected and/or from parameters included in the received data. Such a detection is very flexible over time and efficient.

In an implementation, the method may include the following steps: detecting a state of presence of the given object in the vehicle by direct sensing; collecting said data received over time from various devices in the vehicle, that is indicative of the presence of the given object in the vehicle; and using the collected data as training data for further training the machine-learning model.

Thus, if the given object is directly detected for example from captured image data, the data received from the in-vehicle devices may be used as new training data to perform an additional training of the machine-learning model.

In an implementation, the step of deriving parameters related to said given object in the vehicle from the received data includes at least one of the following steps: a step of estimating and tracking a body pose of a person in the vehicle from image data captured by an image sensor device to determine a behaviour of said person towards the given object; the given object being a child, a step of detecting an action of inserting a child in the vehicle through an open door from data captured by one or more sensor devices; and the object being a child, a step of detecting movements in a child seat region from data captured by a sensor device.

The task of estimating and tracking a body pose of a person in the vehicle (driver or passenger) may be performed to determine one or more parameters, or pieces of information, related to a body behaviour of the person towards the given object, for example turning around to a child seat several times in a journey of the vehicle.

The detection of movements in the region of a child seat may also provide a piece of information or parameter indicative of the presence of a child in the vehicle.

The detection of the action of inserting a child into the vehicle may also provide a piece of information or parameter indicative of the presence of a child in the vehicle.

In an implementation, the vehicle may include a memory for storing a user profile of a driver indicating that said driver has a child or a driving history information indicating the presence of a child with said driver several times in the past. In such a case, deriving parameters related to the given object from the received data may include a step of reading in the memory an information of presence of said given object in the stored user profile or in the stored driving history information.

The vehicle may have in memory a user profile of the driver (or other passenger) indicating that the driver has children, or a driving history information indicating the presence of a child with the driver several times in the past. Such information may be a parameter or piece of information indicative of the presence of a child in the vehicle.

In an implementation, deriving parameters related to the given object from the received data may further include at least one of the following steps: a step of detecting the presence in the vehicle of one or more objects ancillary to said given object (e.g., a child), from data captured by an image sensor device; and a step of analyzing captured audio data, and a step of analyzing a content played by an infotainment system of the vehicle.

The presence of one or more objects ancillary to the object may also be detected from data captured by an image sensor device for example. When a child is on board, the image sensor device may capture images including a toy, a child equipment or any other object possibly correlated with the presence of a child in the vehicle. The detection of an object ancillary to the object in the vehicle provides a piece of information, or parameter related to the child, indicative of the presence of a child in the vehicle.

The object being a child, the method further may include a step of analyzing a content played by an infotainment system of the vehicle. If one or more contents played by the infotainment system of the vehicle may be classified as contents suitable for children, for example using content filters like the ones used in parental control applications, it may provide a piece of information or parameter indicative of the presence of a child in the vehicle.

The detection of a child voice in captured audio data into the vehicle may also provide a piece of information or parameter indicative of the presence of a child in the vehicle.

In an implementation, the plurality of accumulated parameters indicative of the presence, or the absence, of the given object in the vehicle may include different types of parameters, and different weights may be respectively attributed to scores related to the different types of parameters to increase the confidence value.

In an implementation, the method may further include an alert step triggered upon detecting that the given object is left in the vehicle after the one or more passengers have left the vehicle. An warning action may then be performed and include for example displaying a flag on a display in the vehicle and/or outputting an alert (light and/or sound alert) when the person in the vehicle leaves the vehicle without the object.

The present disclosure also concerns a data processing device for detecting the presence of a given object in a vehicle including a receiving unit for receiving data from various devices in the vehicle and a processing unit adapted to execute the steps of the method previously defined.

The present disclosure also concerns a computer program comprising instructions which, when the program is executed by a computer, cause the computer to carry out the steps of the method previously defined and a computer-readable medium having stored thereon the computer program, as well as a vehicle including the data processing device above defined.

BRIEF DESCRIPTION OF THE DRAWINGS

Other features, purposes and advantages of the disclosure will become more explicit by means of reading the detailed statement of the non-restrictive implementations made with reference to the accompanying drawings.

DETAILED DESCRIPTION

Figure 3:
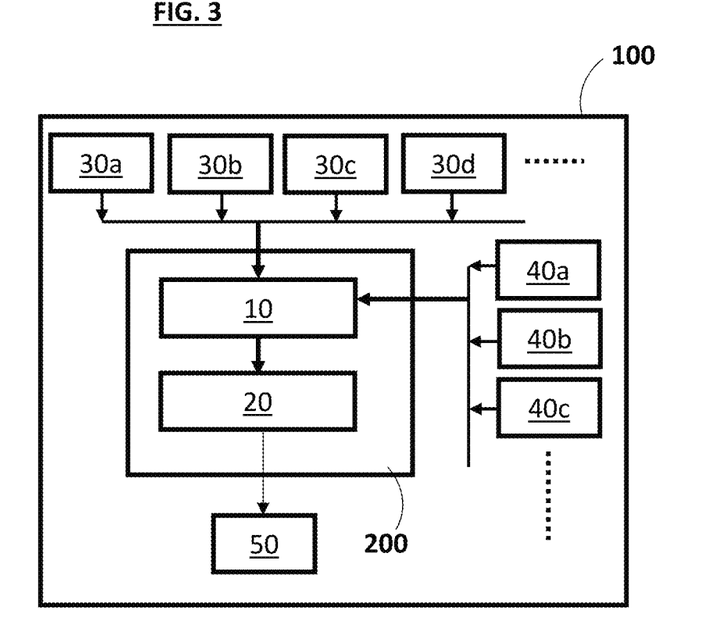
FIG. 3 shows a functional block diagram of a data processing device for detecting the state of presence of a given object in a vehicle according an implementation.

The present disclosure concerns a computer-implemented method for detecting and managing a state of presence of a given object in a vehicle 100, for example a car, and a data processing device 200 including a receiving unit or interface 10 for receiving data from various devices 30*a*, 30*b*, . . . in the vehicle 100 and a data processing unit 20 for executing the steps of the computer-implemented method. The processing unit 20 includes one or more software modules of program instructions running on the processing unit 20 for implementing the different steps described below, that are performed by the processing unit 20.

The object may include a child, an animal, or a person for example. Such an object may require attention from a person (driver and/or other passenger) in the vehicle 100.

The software modules may include an object or person detection module, a tracking body module, an audio analyzer, and/or any other appropriate functional module to implement the steps described below. In an implementation, the software modules may include one or more machine learning modules trained to execute one or more steps or tasks.

The vehicle 100, schematically represented in FIG. 3, may be equipped with one or more sensor devices. In an implementation, the in-vehicle sensor devices may include at least one image sensor device 30*a*, for example a camera sensor device and/or a radar sensor. Optionally, the sensor devices may include an audio sensor device 30*b*, one or more door sensors 30*c* sensing the opening and closing of the vehicle doors, a motion sensor 30*d*, an acceleration sensor or any other type of appropriate sensor device.

The vehicle 100 may further include other devices or systems such as an infotainment device or system 40*a*, one or more memory device(s) 40*b*, and at least one in-vehicle monitoring system such as a driver monitoring system 40*c* and/or a cabin monitoring system 40*d*. The memory devices 40*b* may store one or more user profiles, and/or driving history information related to one or more users. The user profile and/or the driving history information related to a given user may include an information of presence in the vehicle 100 of a given object, for example a child and/or animal, several times in the past when said user was in the vehicle 100.

The computer-implemented method allows to indirectly detect a state of presence of a given object, such as a child or baby, or an animal, in the vehicle 100. It may be used in case the given object is not directly visible by an in-vehicle monitoring system 40*c*, 40*d* and/or there is no direct visibility of the object from an image sensor device 30*a* of the vehicle 100.

Figure 1:
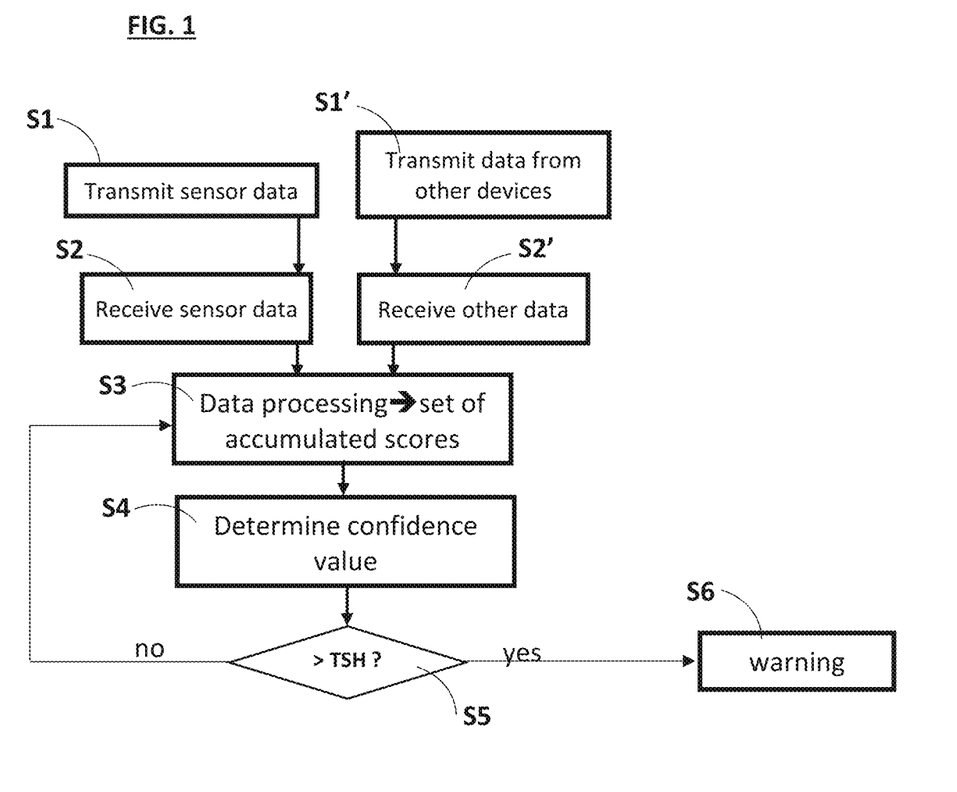
FIG. 1 shows a flowchart of a method of detecting a state of presence of a given object in a vehicle according to an implementation.

An implementation of the method for detecting a state of presence of a given object, for example a child, in a vehicle 100 will now be described with reference to FIG. 1. It is assumed that the given object is not directly visible by an in-vehicle monitoring system or image sensor In a step S1, the sensor devices 30*a*, 30*b*, . . . of the vehicle 100 capture data and transmit the captured data to the data processing device 200. The step S1 may be performed continuously over time when the vehicle 100 is in operation. The vehicle 100 may move or be stopped in operation. For example, the camera sensor device 30*a* may capture images of the interior of the cabin of the vehicle 100, within a given field of view. The captured images may cover the two front seats, the interior of the two front doors, and partially the back seats. For example, the sensor devices 30*c* may also detect the opening and closing of each vehicle 100 door.

In a step S2, the sensor data from each of the sensor devices 30*a*, 30*b*, . . . is received by the data processing device 200, here through the receiving unit 10. The sensor data may be received continuously over time (typically, in real time, as it is captured).

In a step S1', other in-vehicle devices or systems such as the infotainment system 40*a*, the memory devices 40*b*, the driver monitoring system 40*c* and/or the cabin monitoring system 40*d* may transmit data to the data processing device 200. For example, the infotainment system 40*a* may transmit information related to an audio and/or video content being played by the infotainment system 40*a*. An information related to the presence of a child or animal in the vehicle 100 when the current driver was driving the vehicle 100 in the past may be transmitted from a memory device 40*a* to the data processing device 200. Data or parameters detected by an in-vehicle monitoring system 40*c* or 40*d* may also be transmitted to the data processing device 200. Thus, in a step S2', the data processing device 200 may receive data from devices other than the sensors over time, when the vehicle 100 is operated.

The data received over time by the data processing device 200 from multiple in-vehicle devices 30*a*, 30*b*, . . . , 40*a*, 40*b*, . . . in the step S2 and S2', performed in parallel or in any order, may include image data, sound data, sensor data, infotainment data, stored data, etc. The received data may contain parameters related to a given object, such as a child in the present illustrative and non-limitative example, that are indicative of the presence or the absence of said object in the vehicle 100.

In a step S3, the data received over time from the multiple in-vehicle devices 30*a*, 30*b*, . . . , 40*a*, 40*b*, . . . may be processed by the processing unit 20 to derive a plurality of parameters or pieces of information related to the presence or absence of a given object in the vehicle 100, and determine a set of accumulated scores. The data may be received at successive points in time and then processed over time to accumulate the scores over time.

A parameter, or piece of information, contained in the data received by the data processing device 200 from the multiple in-vehicle devices 30*a*, 30*b*, . . . , 40*a*, 40*b*, . . . may be indicative of the presence, or the absence, of the given object in the vehicle 100 with a certain degree of uncertainty. It means that the piece of information or parameter is possibly correlated with the presence, or absence, of the given object in the vehicle 100. A parameter indicative of the presence of the object in the vehicle is not a direct and certain detection of the object, like for example a direct detection of the object from an image captured by an image sensor device. It may indicate a likelihood that the object is present in the vehicle 100.

Figure 2:
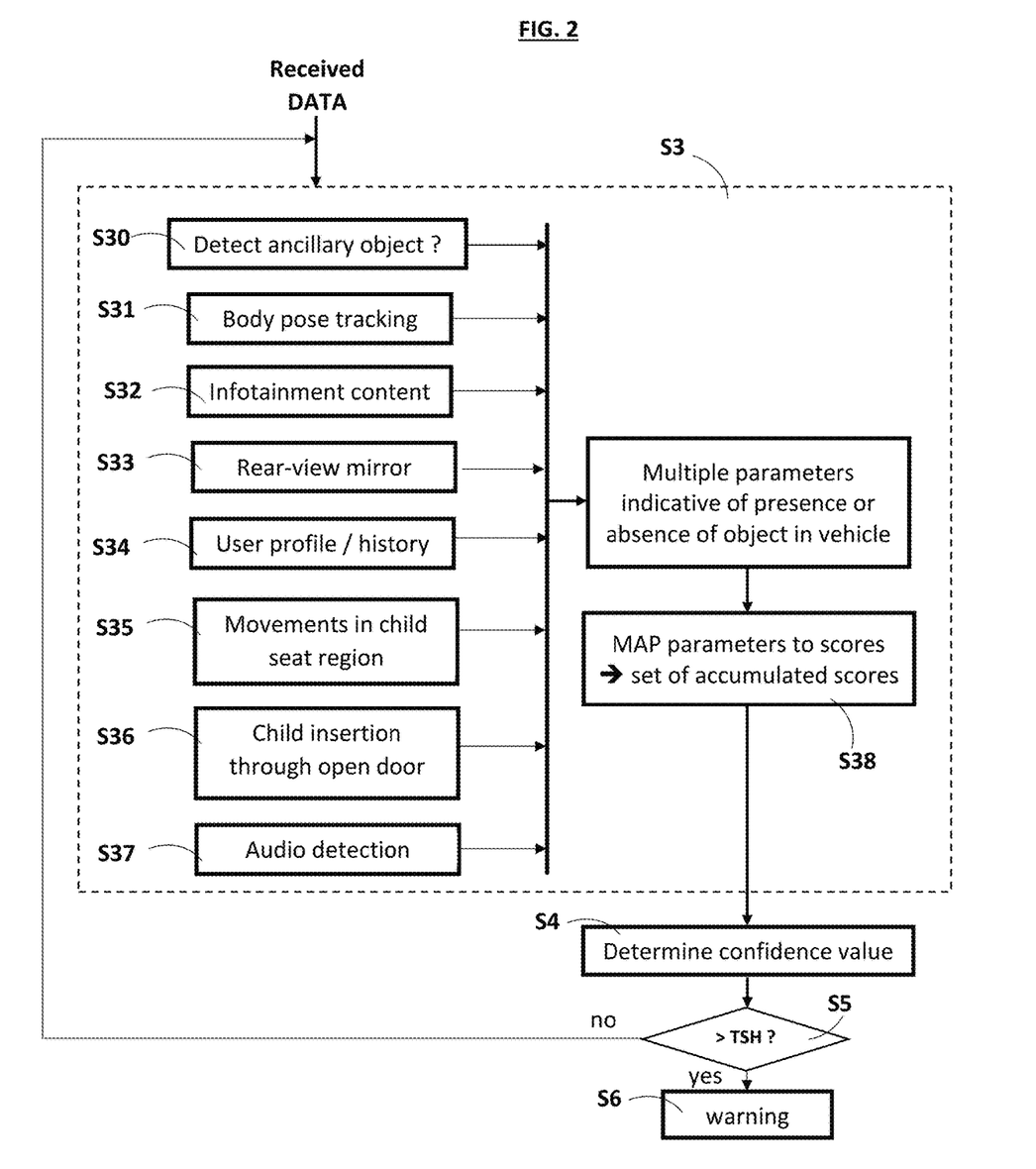
FIG. 2 shows a flowchart of a process of processing data to accumulate scores and determine a confidence value related to a state of presence of a given object in the vehicle, according to an implementation.

The step S3 of processing the data received by the receiving unit 10 may include the execution, by the processing unit 20, of different types of detections using the received data to determine or derive parameters or pieces of information related to the given object, for example a child, from the received data. For example, a non-exhaustive list of detections is given by: a detection of an ancillary object correlated with the presence of the given object, such as a toy in case the given object is a child; an estimation and tracking of body pose of a driver and/or passenger in the vehicle 100 to detect a specific behaviour of a person towards the given object; a classification of an audio and/or video content played by an infotainment system of the vehicle 100; a detection of rear-view mirror checks and/or adjustments; an identification of an information of presence of the given object in a user profile and/or driving history information of the driver; a detection of movements in a child seat region; a detection of an action of inserting a child into the vehicle 100 through an open door; and/or a voice or audio detection.

Thus, the step S3 may include a step S30 of detecting and classifying one or more objects ancillary to the given object, indicative of the presence of the given object in the vehicle 100. For example, in case that the given object is a child, the ancillary objects may include a child seat, a booster seat, toy(s), any other baby or kid equipment, etc. In an implementation, the ancillary objects may be detected by the processing unit 20 from image data captured by the camera sensor device 30*a*. In that case, the processing unit 20 may implement a function of object detection. The information related to the presence of one or more objects ancillary to the given object, for example a child, may be a parameter indicative of the presence of the given object in the vehicle 100. Optionally, the processing unit 20 may use data from a sensor for detecting a state attached or non-attached of a child seat.

The step S3 may further include a step S31 of estimating and tracking the body pose of each person in the vehicle 100 from image data captured for example by the camera sensor device 30*a* or an in-vehicle monitoring system 40*c*, 40*d* to detect a behaviour of said person towards the object. The step 31 may be performed by the processing unit 20 executing an algorithm (software component) of body pose tracking to track the body behaviour of the driver or other passenger in the vehicle 100. In the step S31, the seating position of each person (driver or other passenger) may be detected and the body pose of the person may be monitored from captured image data. In an implementation, key body points (e.g., shoulders, hands, elbows, knees, hip points, facial feature points, etc.) may be detected and tracked. The information on the body key points may be two-dimensional or three-dimensional. Then, by monitoring the key body points over time, the processing unit 20 may estimate and track the body pose of the person and detect body movements of turning around, and/or looking or reaching to a child seat. The following elements of information or parameters may be further derived from the captured image data: points in time when the person starts and stops turning around, duration the person is turning around, frequency the person is turning around. In case that a child seat is detected at a given position in the vehicle 100, the processing unit 20 may derive interactions between a person seating in the vehicle 100 and the child seat, based tracking a hand of the person in the proximity of the child seat. Other information as a frequency or duration of the interactions between the person and the child seat may be accumulated and used as pieces of information or parameters that are indicative of the presence of said object in the vehicle 100 with a certain degree of uncertainty. In another variant, the processing unit 20 may determine a temporal sequence of hand interactions with the child seat or with the child within the child seat. The temporal sequence may further include an action of reaching an object ancillary to the child (such as a toy, a passifier, a book, a bottle, . . . ) and moving it to the inside of the child seat. On the contrary, in case there is no child in the vehicle 100, the data processing device 200 may detect that the passengers in the vehicle 100 do not move, or move little, or do not have any movement related to a child, in the step S31 of estimating and tracking body pose. Thus, the estimation and tracking of body pose related to passengers of the vehicle 100 enables to derive multiple parameters or pieces of information that are indicative of the presence, or absence, of the given object, such as a child, in the vehicle 100.

In case that the given object is a child, the step S3 may further include a step S32 of analyzing and classifying an audio and/or video content (music, video, etc.) played by the infotainment system 40a of the vehicle 100, to determine whether or not said content is a content appropriate for children. It may also be determined if the content is inappropriate for children. The analysis and classification of the content may be performed using content filters as those used in parental control applications. The analysis and classification may be performed on data captured by the audio sensor 30b, or on audio data and/or metadata related to content directly transmitted by the infotainment system 40a to the data processing device 200. Thus, in the step S32, the data processing device 200 may determine a class of the content played by the infotainment system 40a, that may be either content suitable for children and content not suitable for children. A content suitable for children is for example a cartoon for children, while a content not suitable for children is for example a piece of hard rock music. The determined class may be a parameter or piece of information indicative of the presence, or absence, of a child in the vehicle 100.

The step S3 may further include a step S33 of detecting an adjustment of the rear-view mirror by the driver, which is indicative of the driver putting importance on using the rear-view mirror. Optionally, it may be further detected that the rear-view mirror is adjusted in a way that the driver gets a better view on and may monitor a given rear seat. The detection S33 may be performed using data from one or more sensors, for example the motion sensor 30d and/or acceleration sensor, for deriving the absolute position and orientation of the rear-view mirror, in particular in case of a rear-view mirror with manual adjustment. Alternatively, the rear-view mirror may be controlled with an electronic adjustment. In that case, a deviation between an ideal position to see the road through the rear-view mirror and the ideal position to see a given rear seat may be computed and used to adjust the position of the rear-view mirror. Such information related to adjustment of the rear-view mirror made by the driver may be used as a parameter or piece of information indicative of the presence of a child in the vehicle 100. On the contrary, in the step S33, the data processing device 200 may detect that the driver does not make any specific adjustment of the rear-view mirror and this information may be used as a parameter indicative of the absence of child in the vehicle 100.

The step S3 may further include a step S34 of retrieving from a memory device 40b an information of presence of the given object, such as a child, in the vehicle 100, included in a stored user profile or in a stored driving history information related to a current driver or passenger of the vehicle 100. The information of presence of the object in the stored driving history information and/or in the stored user profile may optionally be combined with timing information and/or location information such as GPS traces (that correspond to patterns of picking up kids from school for example). Such an information of presence of the given object, for example a child, in the vehicle 100, extracted from a user profile or a driving history information, may be used as a parameter indicative of the presence of the given object in the vehicle 100.

In case that the object is a child, the step S3 may further include a step S35 of detecting movements in a child seat region. Any movement within the region of a seat with a child seat detected may increase the probability that a child is in the child seat. For example, trackable feature points may be detected in the region of the child seat and in the surrounding area from captured image data. Movements (feature displacements in the captured image data) inside the child seat regions may be compared to movements outside the seat region. The average movement outside the child seat region may be subtracted from the movements in the inside of the child seat region. The remaining delta corresponds to movements that are specific to the child region. It may further be fed into a classification module that distinguishes typical movements induced by a child from other movements induced by vehicle 100 motions. The information related to movements detected in the child seat region may be a parameter indicative of the presence of a child in the vehicle 100. If no movement is detected in the child seat region, the information may be used as a parameter indicative of the absence of child in the vehicle 100.

In case that the object is a child, the step S3 may further include a step S36 of detecting an action of inserting a child into the vehicle 100 through an open door from data captured by the image data captured by the camera sensor device 30. A detected action of inserting a child into the vehicle 100 may be used as a parameter indicative of the presence of a child in the vehicle 100. In an implementation, the field of view of the camera sensor device 30 may have at least a partial view on the vehicle 100 doors and a person outside the cabin may be detected from the image data captured by the camera sensor device 30. Optionally, by processing the captured image data, it may be determined that one or more parts of the body of the outside person reach into the cabin (e.g., arms or hands) and/or that a child, for example a baby, may be inserted into a seat region.

In a variant, when a person inserts a child, for example a baby, into the vehicle 100, the processing unit 20 may detect the child while still in the field of view of the camera sensor device 30, before hiding it in a child seat.

Such detections may be performed by a function of object detection and/or a function of estimating and tracking human body key points, implemented on the processing unit 20 and using the image data captured by the camera sensor device 30.

The processing unit 20 may further use data related to the door opening state, captured by the sensor device 40, and/or corresponding signals on a vehicle 100 message bus.

The step S3 may further include a step of audio detection S37. A microphone device may be used to capture audio signals in the cabin of the vehicle 100. The captured audio signals may then be analyzed by the processing unit 20 in the step S37 to detect, for example, special sounds related to a child or baby (e.g., screaming, crying, or laughter of a baby), special sounds related to an animal like a dog; and/or key words suggesting that a person in the vehicle 100 is talking with a child (child name, a specific language, etc.) or an animal.

The detected audio information may be used as a parameter indicative of the presence of a given object, such as a child or animal, in the vehicle 100.

The processing unit may further classify a speaker age from the captured audio signals. The information on the speaker age may be used as a parameter indicative of the presence, or absence, of a child in the vehicle 100.

The detections S30 to S37 may be performed over time, in parallel or in any order. They result in gathering over time a plurality of parameters or pieces of information. The parameters are related to the given object, for example a child, and are indicative of the presence or absence of the given object in the vehicle 100. In other words, each parameter may be an indication of the presence or absence of the given object in the vehicle 100. It has a certain degree of uncertainty related to the presence, or absence, of the given object in the vehicle 100. The multiple parameters resulting from any of the detection steps S30-S37, are accumulated over time.

The method may further include a step S38 of mapping the parameters derived from the data received and processed by the data processing device 200 in the steps S30-S37 to respective scores. The scores may be predetermined values or determined by scoring functions. The score of a parameter may depend on the type of this parameter. The score to which a parameter is mapped may be fixed or may vary depending on various factors, for example an uncertainty related to said parameter.

Illustrative examples of how to map the parameters to scores are given below in relation to the detection steps S30 and S31.

Let us consider a score determined for detections S30 of ancillary objects related to a given object such as a child. This score may be initially set to zero. Each detected ancillary object may increment this score in proportion to its likelihood of indicating the presence of a child. Likelihoods can have predetermined values predefined for individual object classes or groups of object classes.

A likelihood can further be weighted with a confidence of detection of the ancillary object in the present example. For example, the confidence of detection may be represented by a float value between 0 (no confidence) to 1 (highest confidence).

In another variant, a position of the detected ancillary object can also be used as another factor to determine the score.

For example, the total score determined from detections S30 of ancillary objects related to a given object like a child may be expressed as follows:

$$\text{score} = \sum_{i=1}^{I} likelihood_{obj\_class(i)} \times confidence_{obj\_class(i)} \times likelihood_{obj\_location(i)}$$

where i is an index of a detection S30 of an ancillary object

I is the total number of detections S30 of ancillary objects $likelihood_{obj\_class(i)}$ a likelihood value that the class of the ancillary object i indicates the presence of a child in the vehicle;

$confidence_{obj\_class(i)}$ is a confidence value for the detection of the ancillary object i;

$likelihood_{obj\_location(i)}$ is a likelihood value that the location of the ancillary object i indicates the presence of a child in the vehicle.

Let us consider a score determined for detections S31 related to movements of a person in the vehicle 100. This score may be initially set to zero. Every time a person is doing a predetermined movement, such as reaching with a hand towards a child seat, turning around, looking at the child seat, etc., a corresponding counter may be increased by 1, all counters being initially set to zero. In an implementation, a counter could also be decremented by certain actions, e.g., a person putting a large object onto the child seat.

The respective values of the different counters may be combined to determine a final score. A function of weighted sum of all counters could be used to compute the final score. Each counter can have a specific weight. The weights allow to selectively rate or score each feature or movement. Thus, one feature, such as reaching to child seat, may be rated higher than another feature, such as looking to child seat.

The step S38 may be performed by the data processing device 200 to accumulate scores and produce a set of accumulated scores. The step S38 of determining and accumulating scores may be performed continuously over time, while the vehicle 100 is in operation. In this way, scores may be continuously added over time in the set of accumulated scores.

The method further includes a step S4 of determining an object-related confidence value for the state of presence of the given object in the vehicle 100. The step S4 may be performed by the data processing device 200. For example, in case the given object is a child, the determined confidence value is related to a child. The confidence value is a value representing a likelihood for the given object to be present in the vehicle 100.

The object-related confidence value is determined based on the scores accumulated in the step S38. In a particular implementation, the determination of the object-related confidence value may include a step of calculating a cumulative sum of the accumulated scores. Optionally, respective weights may be attributed to the scores. The weights may depend on the parameters which have been mapped to said scores. Thus, the scores may be multiplied by the corresponding weights in the step of calculating the cumulative sum of the accumulated scores.

In an implementation, the scores indicative of the presence of the given object in the vehicle 100 may be positive, while the scores indicative of the absence of the given object in the vehicle 100 may be negative. Thus, the object-related confidence value should be increased by a positive score and decreased by a negative score. For example, the confidence value may be decreased by a certain amount, when a content that is inappropriate for children, for example a piece of hard rock music, is played by the infotainment system 40*a* of the vehicle 100, but increased by a certain amount, when a content that is for children, for example a cartoon, is played by the infotainment system 40a of the vehicle 100.

The object-related confidence value may be updated when a new score is added to the set of accumulated scores, preferably each time a new score is added to the set of accumulated scores.

In a particular implementation, the object-related confidence value may be a likelihood value.

In an implementation, the likelihood value may be expressed in percentage or be a value between 0 and 1. For example, a probability of 100% means that the object is certainly present in the vehicle 100 and a probability of 0% means that the object is certainly not present in the vehicle 100. In that case, the scores may be portion values of probability. In another implementation, the confidence value and scores may be scaled in a different manner.

In an implementation, the object-related confidence value may be determined, or computed, when the vehicle 100 is stopped and an operation of the vehicle is ended, based on the set of accumulated scores determined when the vehicle was in operation.

In another implementation, the object-related confidence value may be determined by a machine-learning model.

The machine-learning model may receive as input data the data received from the multiple devices 30a, 30b, . . . , 40a, 40b, . . . in the vehicle 100, and/or the parameters indicative of the presence or absence of the given in the vehicle 100 determined in the step S3. The machine-learning model may include a neural network.

The machine-learning model may be trained with training data including input training data including a plurality of sets of data from in-vehicle devices such as the sensors 30a, 30b . . . and other devices 40a, 40b, . . . as previously described, or parameters derived from the received data as described in the steps S30-S37, each set of data or parameters corresponding a scenario recorded in the past by a recording vehicle 100, and output training data including, for each set of data or parameters, a confidence value for the state of presence of the given object in the vehicle 100, attributed manually for the corresponding scenario.

In another implementation, the machine-learning model could be trained to learn a binary state representing a state "child present" or a state "child not present", from the input data. Then, the confidence value may be derived as a function of the output of machine-learning model.

In another variant, the input training data could be synthetic data, for example obtained by simulation, or a mix of real and synthetic data.

After determining the object-related confidence value for the presence of the given object in the vehicle 100, the method further includes a step S5 of comparing the determined object-related confidence value with a predetermined threshold and detecting the presence of the object when the confidence value exceeds said threshold.

The step S5 of comparing the confidence value with a predetermined threshold and detecting the presence of the object in case that the confidence value reaches or exceeds the predetermined threshold is performed by a software module (or program instructions) running on the processing unit 20. The step S5 could be performed by the machine-learning model that determines the confidence value.

In an implementation, a state of presence of the given object, for example a child, in the vehicle 100 may be detected by direct sensing, typically from captured images, for example during the operation of the vehicle 100. In that case, the method may further include the steps of: collecting or gathering data received over time by the data processing device 300 from the multiple devices in the vehicle 100, in the steps S2, S2', that include parameters indicative of the presence of the given object in the vehicle 100; and using the collected data as training data for additional training the machine-learning model.

The additional training may be performed by running an integrated software part on a processor or computer inside the vehicle 100, or the training data could be transferred out of the vehicle 100, for example to a cloud backend or a backend server, and processed outside.

The state of presence of the given object may alternatively be detected just after the vehicle has been stopped, after operation. In that case, the data previously received over time by the data processing device 300 when the vehicle 100 was in operation may have been recorded and be used as training data for additional training of the machine-learning model.

In an implementation, in case of detection of an object in the vehicle 100 in the step S5, the method may further include an alert step S6 of warning about the presence of the given object in the vehicle 100. The alert step S6 may be triggered upon detecting that said object has been left in the vehicle 100 after all passenger(s) have left the vehicle 100.

In an implementation, the warning may use output means 50 of the vehicle 100, for example by displaying a flag indicating "child on board" on a display of the vehicle 100. Alternatively, or additionally, the warning may include outputting an audio and/or light signal by the vehicle 100 to warn a person leaving the vehicle 100 that the given object has been left in the vehicle 100. In a variant, a warning may be triggered on a mobile phone of the driver. More generally, the state of presence of the given object may be communicated through any appropriate communication channel, for example a message inside the vehicle or outside the vehicle, a message on a smartphone, an email, a vehicle lighting variation inside and/or outside the vehicle, honking or other external sound generation.

In an implementation, in case of detection of a given object, like a child, in the vehicle 100 in the step S5, the method may further include a step of adapting a feature or parameter or function of an in-vehicle system, such as an ADAS (Advanced Driver Assistance System) system, to the presence of the detected object in the vehicle 100. For example, after detection of a child in the step S5, a safety parameter of an ADAS system may be programmed. As illustrative examples, an air-bag system near the child seat may be disabled, a vehicle speed limit may be programmed, a soft braking mode may be activated, etc.

The steps S2 to S5 of indirect detection of the given object are looped over time on new received data to determine and check the confidence value. In an implementation, once the confidence value has reached the threshold, the steps S2 to S5 are only partially executed or are not executed any more. In another implementation, the steps S2 to S5 continue to be executed even after reaching the threshold. It allows to monitor further interactions with one or more objects.

The present disclosure also concerns a computer program comprising instructions which, when the program is executed by a computer, cause the computer to carry out the steps of the method previously described.

The present disclosure may further include one or more of the following additional examples which may describe and/or relate to further aspects or features within the context of the present disclosure.

EXAMPLE 1

A computer-implemented method for detecting the presence of an object for attention in a vehicle including:

receiving data captured by at least one sensor device in the vehicle, processing the received data to collect a plurality of pieces of cue information that are indicative of the presence of said object for attention in the vehicle with a certain degree of uncertainty; computing a confidence value for the presence of said object for attention in the vehicle, wherein the more pieces of cue information are collected the more the confidence value is increased; and comparing the confidence value with a threshold and detecting the presence of said object when the confidence value exceeds said threshold.

EXAMPLE 2

The method according to example 1, further including a step of estimating and tracking a body pose of a person in the vehicle from image data captured by an image sensor device to determine a behaviour of said person towards the object for attention.

EXAMPLE 3

The method according to example 1 or 2, further including a step of detecting the presence of one or more objects ancillary to said object for attention, from data captured by an image sensor device.

EXAMPLE 4

The method according to any of examples 1 to 3, wherein, the object for attention being a child, the method further includes a step of analyzing a content played by an infotainment system of the vehicle so as to determine if said content is a specific content for children.

EXAMPLE 5

The method according to any of examples 1 to 4, further including a step of reading in memory an information of presence of said object for attention in a user profile or in a driving history of the vehicle.

EXAMPLE 6

The method according to any of examples 1 to 5, wherein, the object for attention being a child, the method further includes a step of detecting movements in a child seat region from data captured by a sensor device.

EXAMPLE 7

The method according to any of examples 1 to 6, wherein, the object for detection being a child, the method further includes a step of detecting an action of inserting a child through an open door from data captured by one or more sensor devices.

EXAMPLE 8

The method according to any of examples 1 to 7, wherein, the object for detection being a child, the method further includes a step of analyzing captured audio data and classifying the audio data as a child voice.

EXAMPLE 9

The method according to any of clauses 1 to 8, wherein the plurality of pieces of information collected includes different types of pieces of cue information, and different weights are attributed to the different types of pieces of cue information to increase the confidence value.

EXAMPLE 10

The method according to any of examples 1 to 8, wherein the plurality of pieces of cue information are provided as inputs to a machine learning module that performs a task of computing the confidence value.

EXAMPLE 11

The method according to any of clauses 1 to 10, further including a step of warning a person of the vehicle of the presence of the object for attention in the vehicle.

EXAMPLE 12

The method according to clause 11, further including a step of detecting that said object for attention is left in the vehicle after the one or more passengers left the vehicle from data captured by a sensor device, that triggers the execution of the step of warning.

EXAMPLE 13

A data processing device for detecting the presence of an object for attention in a vehicle including a receiving unit for receiving data including data captured by at least one sensor device in the vehicle; and a processing unit adapted to execute the steps of the method according to any of examples 1 to 12.

EXAMPLE 14

A computer program including instructions to cause the device of example 12 to execute the steps of the method of any of examples 1 to 12.

EXAMPLE 15

A vehicle including the device according to example 13.

What is claimed is:

1. A method comprising:
processing data received over time from various devices in a vehicle, including determining different types of parameters indicative of at least one of a presence or an absence of an object in the vehicle based on the received data, mapping the different types of parameters to respective scores, and accumulating the scores in a set of accumulated scores;
determining, based on the set of accumulated scores, an object-related confidence value representing a likelihood that the object is present in the vehicle; and
comparing the object-related confidence value to a predetermined threshold and detecting the presence of the object in the vehicle in response to the object-related confidence value exceeding the predetermined threshold.

2. The method of claim 1, wherein the operation of determining the object-related confidence value further comprises:
updating the object-related confidence value when a new score is added to the set of accumulated scores.

3. The method of claim 1, wherein the operation of processing data is continuously performed over time while the vehicle is in operation to continuously accumulate scores over time in the set of accumulated scores.

4. The method of claim 1, wherein the operation of determining different types of parameters further comprises:
estimating and tracking a body pose of a person in the vehicle from image data to determine a behavior of the person towards the detected object.

5. The method of claim 4, wherein the detected object in the vehicle is a child.

6. The method of claim 5, further comprising:
detecting an action of the person, wherein the action comprises inserting the child in the vehicle through an open door.

7. The method of claim 5, further comprising:
detecting one or more actions of the child, wherein the one or more actions comprise movements of the child in a child seat region.

8. The method of claim 1, further comprising:
storing a user profile of a driver, wherein the user profile comprises driving history information useful to determine a likelihood that the driver is accompanied by a child.

9. The method of claim 8, further comprising:
determining, based at least in part on the driving history information, that the driver is accompanied by the child.

10. The method of claim 1, further comprising:
detecting a presence of one or more objects ancillary to the detected object in the vehicle;
analyzing captured audio data; and
analyzing a content played by an infotainment system of the vehicle.

11. The method of claim 1, further comprising:
alerting, upon detecting that the detected object has been left in the vehicle after one or more passengers have left the vehicle, the one or more passengers.

12. The method of claim 1, wherein the operation of determining the object-related confidence value further comprises:
attributing weights to the respective accumulated scores.

13. The method of claim 1, wherein the operation of determining the object-related confidence value further comprises:
calculating a cumulative sum of the accumulated scores.

14. The method of claim 1, wherein the operation of processing data uses a machine-learning model.

15. The method of claim 14, further comprising:
detecting a state of presence of the object in the vehicle by direct sensing;
collecting data received over time from various devices in the vehicle, the data including parameters indicative of the presence of the object in the vehicle; and
using the collected data as training data for further training the machine-learning model.

16. A system comprising:
a receiving unit configured to receive data from various devices in a vehicle; and
a processing unit, the processing unit configured to:
process data received over time from the various devices in the vehicle, including determining different types of parameters indicative of at least one of a presence or an absence of an object in the vehicle based on the received data, mapping the different types of parameters to respective scores, and accumulating the scores in a set of accumulated scores;
determine, based on the set of accumulated scores, an object-related confidence value representing a likelihood that the detected object is present in the vehicle; and
compare the object-related confidence value to a predetermined threshold and detecting the presence of the object in the vehicle in response to the object-related confidence value exceeding the predetermined threshold.

17. The system of claim 16, wherein the system is a data processing device configured to be implemented in vehicle.

18. The system of claim 17, wherein the vehicle further includes memory accessible by the data processing device, the memory being configured to store at least a user profile of a driver, the user profile including driving history information indicative of a likelihood that the driver is accompanied by a child, and the user profile being useable by the data processing device to determine that the driver is accompanied by the child.

19. A non-transitory computer-readable medium storing one or more programs comprising instructions, which when executed by a processor, cause the processor to perform operations including:
processing data received over time from various devices in a vehicle, including determining different types of parameters indicative of at least one of a presence or an absence of detected an object in the vehicle based on the received data, mapping the different types of parameters to respective scores, and accumulating the scores in a set of accumulated scores;
determining, based on the set of accumulated scores, an object-related confidence value representing a likelihood that the object is present in the vehicle; and
comparing the object-related confidence value to a predetermined threshold and detecting the presence of the detected object in the vehicle in response to the object-related confidence value exceeding the predetermined threshold.

* * * * *

UNITED STATES PATENT AND TRADEMARK OFFICE
CERTIFICATE OF CORRECTION

| | | |
|---|---|---|
| PATENT NO. | : 12,145,523 B2 | Page 1 of 1 |
| APPLICATION NO. | : 17/809102 | |
| DATED | : November 19, 2024 | |
| INVENTOR(S) | : Marek Uszkur et al. | |

It is certified that error appears in the above-identified patent and that said Letters Patent is hereby corrected as shown below:

On the Title Page

Column 1, item (30) Foreign Application Priority Data, Line 1: Before "Jun. 28, 2021", insert --Jun. 20, 2022 (EP) 22179896¶--

In the Claims

Column 15, Line 27: In Claim 10, delete "further comprising:" and insert --wherein the operation of deriving determining the different types of parameter further comprises:-- therefor Column 16, Line 16: In Claim 16, before "object", delete "detected"

Column 16, Line 24: In Claim 17, after "in", insert --the--

Column 16, Line 40: In Claim 19, after "of", delete "detected"

Column 16, Line 49: In Claim 19, before "object in", delete "detected"

Signed and Sealed this
Fifteenth Day of April, 2025

Coke Morgan Stewart
*Acting Director of the United States Patent and Trademark Office*